United States Patent [19]

Heimann

[11] 3,863,671
[45] Feb. 4, 1975

[54] VACUUM REGULATOR CONTROL

[75] Inventor: Bernard Heimann, Washington, Mo.

[73] Assignee: Zero Manufacturing Company, Washington, Mo.

[22] Filed: Mar. 12, 1973

[21] Appl. No.: 340,298

[52] U.S. Cl................. 137/526, 137/514, 137/531, 137/532
[51] Int. Cl........................................... F16k 15/00
[58] Field of Search ............ 137/514, 526, 531, 532

[56] References Cited
UNITED STATES PATENTS

| | | | |
|---|---|---|---|
| 170,268 | 11/1875 | Hudson | 137/532 X |
| 1,442,516 | 1/1923 | Blake | 137/514 |
| 1,512,306 | 10/1924 | Pepper | 137/531 |
| 1,740,567 | 12/1929 | Becker | 137/526 X |
| 1,805,423 | 5/1931 | Staley | 137/532 X |
| 2,346,890 | 4/1944 | Abbott | 137/526 X |
| 2,888,950 | 6/1959 | Wheatley | 137/514 |
| 2,920,643 | 1/1960 | Terrett | 137/532 X |
| 3,302,613 | 2/1967 | Noorlander | 137/532 X |

Primary Examiner—Robert G. Nilson
Attorney, Agent, or Firm—Mason, Mason & Albright

[57] ABSTRACT

A vacuum regulator control for maintaining a predetermined partial vacuum in a milking circuit has an L-shaped linkage lever that is fulcrumed adjacent the juncture of the upright leg and the horizontal leg of the lever. A ball valve is suspended from a pivot point near the upper end of the upright leg so that the valve can seat when the lever pivots on the fulcrum, and prevent ambient pressure from entering the circuit. When the vacuum drops below the desired amount, the valve is drawn downwardly to unseat, allowing ambient air to enter the circuit. A weight is slidably mounted on the horizontal leg to adjust the force which must be exceeded before the valve unseats. Sliding the weight along the horizontal leg with respect to the fulcrum point, varies the force needed to unseat the valve and, consequently, the degree of partial vacuum being maintained in the circuit. By using a fulcrumed lever, the amount of force needed to seat and unseat the valve is favorable to closely regulate and maintain the desired degree of vacuum in the circuit.

8 Claims, 4 Drawing Figures

VACUUM REGULATOR CONTROL

This invention relates to a vacuum regulator which finds particular use in a partial vacuum circuit of the type found in milking installations on dairy farms. In particular, the present invention is useful to establish the desired partial vacuum in such circuits and to admit ambient or compensating pressure when necessary so that the partial vacuum is essentially non-fluctuating in the circuit. Thus, in those partial vacuum circuits which are used in modern milking equipment and connected to an animal's teats, it is important that the partial vacuum be closely regulated to avoid wide fluctuations which can cause mastitus.

Another advantage of closely regulating the vacuum with the subject regulator in a vacuum circuit or line is that the pump's efficiency is dramatically improved. The pump's efficiency is improved to the extent that a 3 H.P. vacuum pump is about equivalent to a 5 H.P. pump using prior art regulators.

It is an object of the present invention to provide a vacuum regulator that can closely regulate the correct degree of partial vacuum in a circuit without allowing wide fluctuations.

It is a further object of this invention to provide a vacuum regulator that will improve the performance of the vacuum pump in the vacuum line.

It is another object of this invention to provide a vacuum regulator that has few moving parts, but is simple and economically made. These and other objects will be apparent from a reading of the below description and drawings in which.

Figure 1:
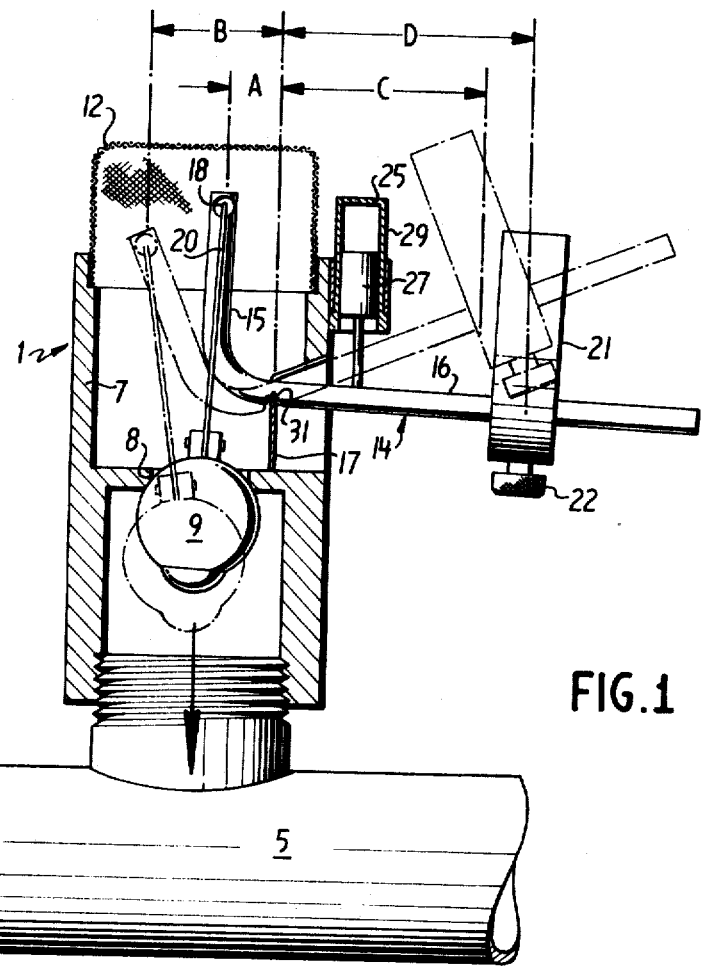
FIG. 1 is a side elevation view in section of the control on the partial vacuum circuit.

In FIG. 1, the regulator control 1 is shown in communication with a partial vacuum circuit 5. The control 1 includes a casing 7 with an internal inlet comprising a seat 8 for movable ball valve 9. The casing 7 has a removable screen cap 12 which overlies inlet 8 and houses a lever member 14.

The lever member 14 is preferably an L-shaped lever with an upright leg 15 and a generally horizontal relatively longer leg 16. The lever member 14 is fulcrumed on support 17 which forms part of casing 7 and affords an edge 31 for a notched portion of leg 16 to pivot about. At the upper portion of leg 15, a pivot point 18 is located to afford a connection between a swingable link 20 and the lever 14. The horizontal leg 16 extends through an opening in the side of casing 7. An adjustable weight 21 is slideable along leg 16 and thumb screw 22 is used to lock the weight 21 in place. The weight 21 is shaped so that its center of gravity lies above leg 16 to accentuate the effect of its movements.

Preferably, a shock absorber 25 is secured to the side of casing 7 with a piston 27 slideable in cylinder 29 against an air cushion at the top of cylinder 29. When lever 14 is pivoted to move leg 16 upwardly, and leg 15 with pivot 18 downwardly, the shock absorber 25 ensures that any abrupt movement will be smooth and not so sudden so as to jar the control 1.

The control 1 can be installed on a horizontal circuit line 5, or on a vertical line, of the type used in milking lines. For example, line 61 in U.S. Pat. No. 3,482,593 having a vacuum pump to evacuate air until the desired partial vacuum is established within a range of about 10 - 20 inches Hg, is suitable. Once the partial vacuum is exceeded, the ball valve 9 is drawn downwardly with lever 14 pivoting on fulcrum 17 so that ambient pressure enters inlet 8 to relieve the partial vacuum. The open position of the valve 9 and lever 14 with weight 21 is shown in dotted lines in FIG. 1.

In FIG. 1, the distance B between the pivot point 18 and the pivot point 31 of lever 14 on fulcrum 17 becomes greater as the leg 15 and pivot point 18 move downwardly and away from the closed position of the lever 14 shown in full lines. At the same time, the distance C between the center of gravity of weight 21 and pivot point 31 decreases so that the effect of the weight diminishes as the valve 9 is opened. Thus, the opening and closing of the valve 9 depends on the setting of weight 21 along leg 16.

When the ball valve 9 is closing to seat on seat 8, the distance A between the pivot points 18 and 31 becomes relatively smaller while the distance D between pivot point 31 and the center of gravity of weight 21 becomes greater so that the effect of the weight becomes greater as the valve 9 seats on seat 8. The result of the aforementioned distance changes is that a very close regulation of partial vacuum is possible, say, up to about one inch of Hg. Thus, an essentially non-fluctuating vacuum is maintained and the opening and closing of valve 9 is not abrupt when maintaining the desired partial vacuum in circuit 5.

In order to compare the subject regulator with a prior art regulator and with a circuit having no regulator, varying degrees of vacuum were developed in a vacuum circuit as follows:

COMPARISON DATA ON STANDARD
PRIOR ART VACUUM REGULATOR AND NEW REGULATOR

| ALL TESTS TAKEN ON A 3 H.P. VACUUM PUMP | | | |
|---|---|---|---|
| | FULL CAPACITY PUMP NO | CAPACITY OF PUMP AT 1" VACUUM DROP BELOW REGULATOR SETTING | |
| VACUUM INCHES Hg | REGULATOR C.F.M. | PRIOR ART REGULATOR | NEW REGULATOR |
| 10 | 86 | 24 CFM-9" Vacuum | 80 CFM-9" Vacuum |
| 15 | 54 | 18 CFM-14" Vacuum | 51 CFM-14" Vacuum |
| 20 | 34 | 15 CFM-19" Vacuum | 33 CFM-19" Vacuum |

In the above table, it is noted that the subject regulator is so efficient as to approach the vacuum levels of the circuit with no regulator.

Figure 2:
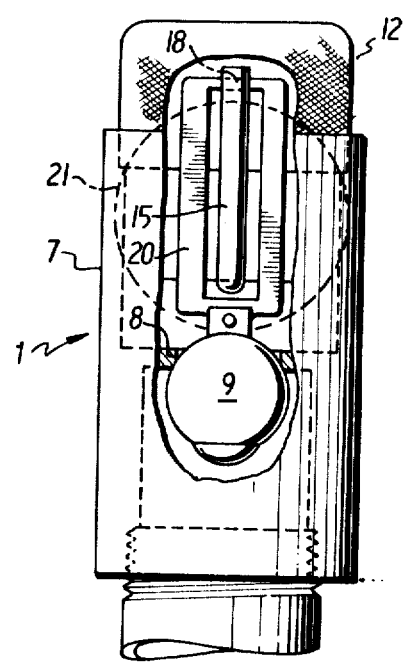
FIG. 2 is a front elevation view of the FIG. 1 control with parts removes.
Figure 3:
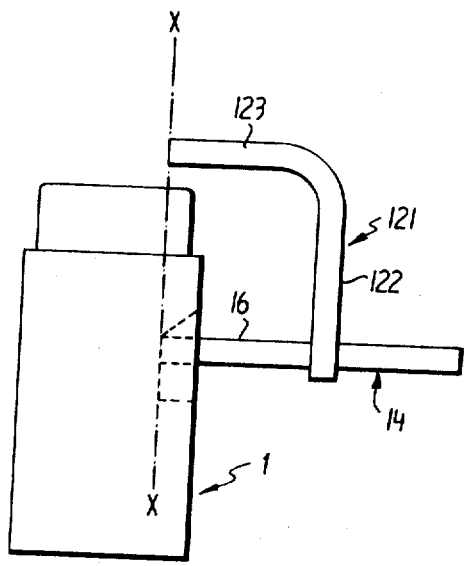
FIGS. 3 and 4 are side elevations of a modified control in closed and open positions.
Figure 4:
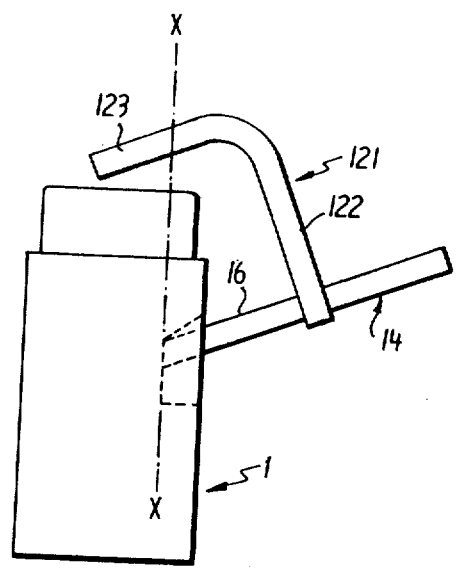

In FIGS. 3 and 4, the control 1, with lever 14 and all other parts are identical to that of FIGS. 1 and 2 except weight 21. Weight 121 is the preferred adjusting means and is formed of an elongated bar element having a lower upright portion 122 and an upper bent over portion 123. The portion 123 is bent at about a 90° angle so as to extend towards the valve body and valve seat so that the center of gravity of the weight 121 is located between the upright portion and the casing 1 when the lever 14 is moved counterclockwise as shown in FIG. 4.

The configuration of the bar that shifts the center of gravity as described above enables a very fine adjustment to the control to be made so that very close regulation of the vacuum in line 5 can be made. The lever 14 is shown fulcrumed to pivot with respect to line X—X. Weight element 121 is slideable along lever 14 to permit adjustments and the lower portion 122 is apertured for this purpose. All other parts of the control are the same as described supra and omitted for the sake of simplicity.

The present invention has been described in connection with a milking vacuum circuit, but it will be appreciated that the invention can be used in any vacuum circuit where close regulation of the degree of vacuum is needed. Although specific details and structure have been disclosed herein, it is to be understood that modifications thereof can be made by those skilled in the art and still be within the spirt of the claims.

What is claimed is:

1. A vacuum regulator control for admitting air in a circuit under partial vacuum, comprising an inlet with a valve seat communicating with said circuit and a movable valve body positioned adjacent said seat to open and close same, an L-shaped lever member located above said seat and said member comprising an upwardly extending leg and a generally horizontal leg, said horizontal leg being supported on a fulcrum, said valve body being pivotably connected to the upper part of the upwardly extending leg at a location substantially above said fulcrum, said valve body being unseatable when the partial vacuum exceeds a predetermined amount and the pivot connection on said lever is moved to its lowermost position, said valve body being seatable in its uppermost position to maintain the partial vacuum in said circuit, said pivot connection being movable upwardly and in a non vertical direction towards said fulcrum, weight means on said horizontal leg, the position of said weight means being adjustable with respect to said fulcrum to vary the degree of partial vacuum needed to unseat said valve body.

2. The control of claim 1 wherein said weight is an elongated element with a lower upright portion and an upper portion that is inclined to the vertical.

3. The control of claim 2 wherein said upper portion is inclined towards the valve body, whereby the center of gravity of the weight is located between said upper portion and the valve body.

4. The control of claim 3 wherein the upper portion of said lever member and the valve body are housed in a casing and said weight is a bar, the upper portion of which is bent towards said casing.

5. The control of claim 1 wherein said valve body is pivotably connected to said lever with a swingable link.

6. The control of claim 1 wherein said seat is located in a housing and comprises an aperture that extends generally horizontal, said valve body being movable upwardly to close said seat and said housing being connectable to an opening in a horizontal circuit line.

7. The control of claim 1 wherein said weight means is slideably mounted on said horizontal leg.

8. The control of claim 1 wherein said horizontal leg and upwardly extending leg are integral and interconnected by a substantially 90° bend, said fulcrum being located adjacent said bend and above said seat.

* * * * *